(12) United States Patent
Hirosawa

(10) Patent No.: US 8,801,198 B2
(45) Date of Patent: Aug. 12, 2014

(54) LIGHT SOURCE DEVICE, PROJECTOR, AND METHOD OF ASSEMBLING LIGHT SOURCE DEVICE

(75) Inventor: Shigeru Hirosawa, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 188 days.

(21) Appl. No.: 13/432,541

(22) Filed: Mar. 28, 2012

(65) Prior Publication Data

US 2012/0249981 A1    Oct. 4, 2012

(30) Foreign Application Priority Data

Mar. 29, 2011    (JP) .................................. 2011-072140

(51) Int. Cl.
*G03B 21/14*    (2006.01)
*G03B 21/20*    (2006.01)

(52) U.S. Cl.
CPC ........ *G03B 21/2033* (2013.01); *G03B 21/2086* (2013.01)
USPC ............. 353/119; 353/31; 353/101; 353/102; 353/122; 362/231; 362/364; 362/375

(58) Field of Classification Search
USPC ........................... 353/31, 100–102, 119, 122; 348/743–744, 787, 794; 372/19, 32, 372/35, 69, 70, 75, 92; 362/259, 339, 231, 362/364, 375
See application file for complete search history.

(56) References Cited

U.S. PATENT DOCUMENTS

| | | | |
|---|---|---|---|
| 5,157,554 A | 10/1992 | Kashihara | |
| 6,310,711 B1 * | 10/2001 | Kobayashi et al. | ........ 359/216.1 |
| 7,349,166 B2 * | 3/2008 | Sakai et al. | ................... 359/822 |
| 7,365,807 B2 * | 4/2008 | Iwai | ............................. 348/794 |
| 7,482,633 B2 * | 1/2009 | Chiaretti | ........................ 257/89 |
| 8,192,030 B2 * | 6/2012 | Mizushima et al. | ............ 353/31 |

(Continued)

FOREIGN PATENT DOCUMENTS

| | | |
|---|---|---|
| CN | 201651903 U | 11/2010 |
| JP | 2001-267670 A | 9/2001 |
| TW | 201035671 A | 10/2010 |
| TW | 201109720 A | 3/2011 |

OTHER PUBLICATIONS

Taiwanese Office Action dated Dec. 20, 2013 (and English translation thereof) in counterpart Taiwanese Application No. 101110686.

(Continued)

*Primary Examiner* — Sultan Chowdhury
(74) *Attorney, Agent, or Firm* — Holtz Holtz Goodman & Chick PC

(57) ABSTRACT

The light source device includes: a first support that supports one of a light source and a collimator lens condensing; a second support that supports the other of the light source and the collimator lens; and a fixing member that fixes the first support to the second support. The first support includes a first protruding portion that protrudes from the first support toward the second support, the first protruding portion having a through hole therethrough. The second support includes a second protruding portion that protrudes from the second support toward the first support, the second protruding portion having: a receiving portion that receives the first protruding portion; and a receiving hole. A rod portion of a locking member is inserted into the through hole and the receiving hole, and a head portion of a locking member is sealed with a sealant.

12 Claims, 13 Drawing Sheets

(56) References Cited

U.S. PATENT DOCUMENTS

| | | | |
|---|---|---|---|
| 8,366,278 B2 | 2/2013 | Kurosaki et al. | |
| 2002/0048001 A1* | 4/2002 | Fujimori | 353/119 |
| 2006/0170885 A1* | 8/2006 | Kitahara | 353/119 |
| 2008/0095020 A1* | 4/2008 | Takahashi et al. | 369/112.24 |
| 2010/0265714 A1* | 10/2010 | Kihara | 362/259 |
| 2012/0050690 A1* | 3/2012 | Enomoto et al. | 353/31 |
| 2013/0114044 A1 | 5/2013 | Inoue et al. | |

OTHER PUBLICATIONS

Chinese Office Action dated Feb. 20, 2014 (and English translation thereof) in counterpart Chinese Application No. 201210149364.7.

* cited by examiner

LIGHT SOURCE DEVICE, PROJECTOR, AND METHOD OF ASSEMBLING LIGHT SOURCE DEVICE

CROSS-REFERENCE TO RELATED APPLICATION

This application claims priority from Japanese Patent Application No. 2011-072140, filed on Mar. 29, 2011, the entire contents of which are hereby incorporated by reference.

BACKGROUND

1. Technical Field

Embodiments described herein relate to a light source device assembled in a projector, a projector, and a method of assembling the light source device.

2. Related Art

Presently, a data projector is frequently used as an image projection device that projects a video image or a screen of a personal computer and images or the like corresponding to image data stored in a memory card or the like on a screen. The projector displays a color image on a screen by condensing the light, which is emitted from a light source, to a micromirror display element called a DMD (digital micromirror device) or a liquid crystal plate.

Hitherto, a projector which uses a high-intensity discharge lamp as a light source has been the mainstream of such a projector. However, various projectors, which use a light-emitting diode, a laser diode, an organic EL, a phosphor, and the like as a light source, have been developed in recent years.

Meanwhile, there is concern that problems may be generated such that the laser diode or the like used as the light source is intentionally taken out from the inside of the projector and used for other purposes, and a user is exposed to a laser beam by accident. For example, JP-A-2001-267670 discloses a laser device that prevents a laser resonator from being intentionally separated from a laser device so that the laser resonator is used for other purposes.

However, JP-A-2001-267670 discloses a laser device of which a part of the laser resonator is broken when the laser resonator is separated, and does not disclose a structure where a light source is not easily separated from a laser device.

SUMMARY OF THE INVENTION

One or more illustrative aspects of the invention are to provide a projector, a light source device, and a method of manufacturing the projector that can prevent a light source of a light source device, which is provided in a projector housing and passes operational inspection, from being separated so that the light source is used for other purposes, by a simple structure without troublesome processes at the time of manufacture.

According to one or more illustrative aspects of the present invention, there is provided a light source device. The device comprises: a first support that supports one of a light source and a collimator lens condensing light emitted from the light source; a second support that supports the other of the light source and the collimator lens; a fixing member that fixes the first support to the second support; and a locking member comprising a head portion and a rod portion connected to the head. The first support comprises a first protruding portion that protrudes from the first support toward the second support, the first protruding portion having a through hole therethrough. The second support comprises a second protruding portion that protrudes from the second support toward the first support, the second protruding portion having: a receiving portion that receives the first protruding portion; and a receiving hole. The rod portion of the locking member is inserted into the through hole and the receiving hole, and the head portion of the locking member is sealed with a sealant.

Other aspects and advantages of the present invention will be apparent from the following description, the drawings and the claims.

DETAILED DESCRIPTION OF EXEMPLARY EMBODIMENTS

Figure 1:
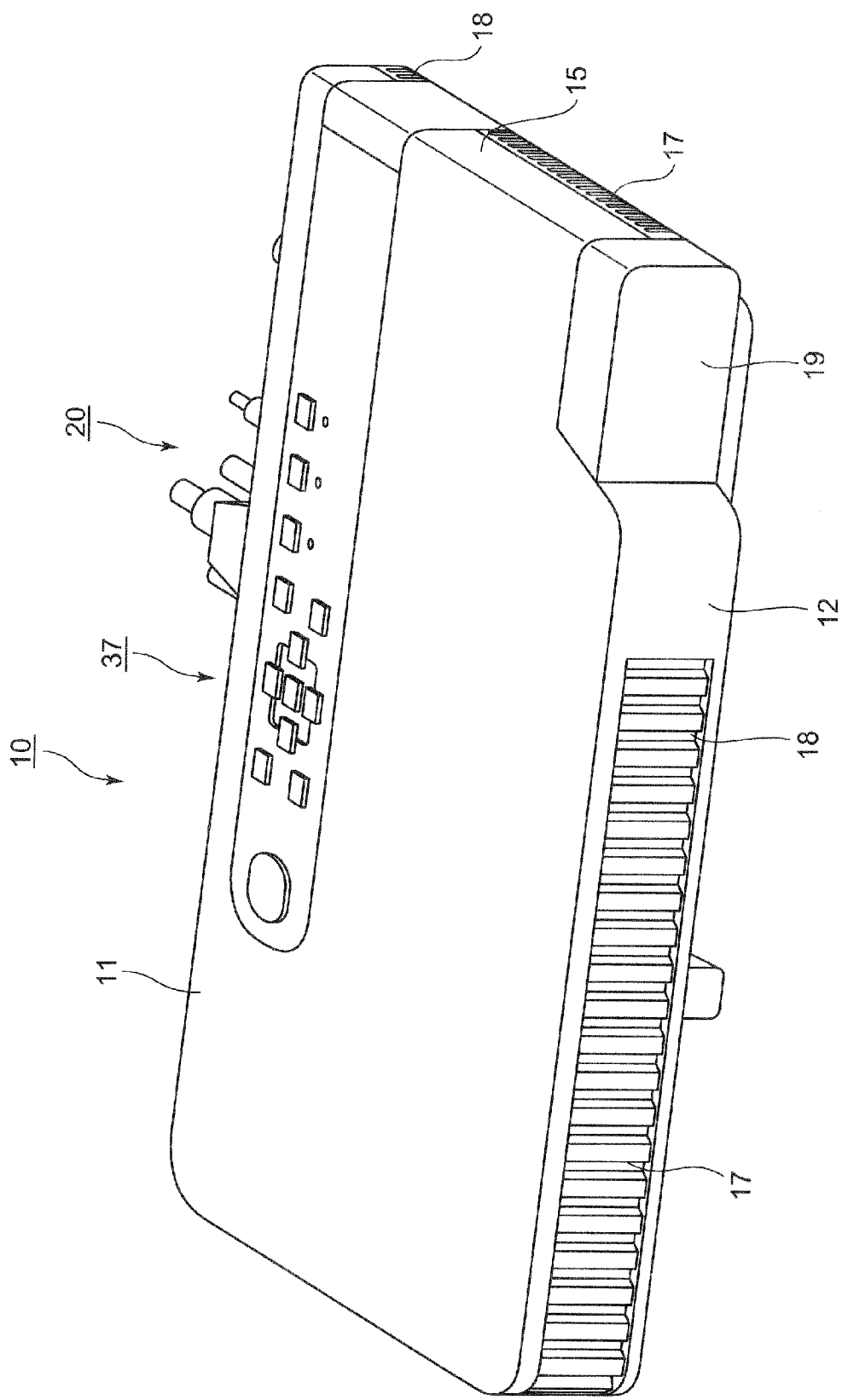
FIG. 1 is a perspective view of the appearance of a projector according to an embodiment of the invention.

An embodiment of the invention will be described below. FIG. 1 is a perspective view of the appearance of a projector 10. Meanwhile, in this embodiment, the left and right of the projector 10 mean the left and right of a projection direction and the front and rear mean the front and rear in a direction where the projector 10 faces a screen and the traveling direction of a luminous flux.

Further, as shown in FIG. 1, the projector 10 has a substantially rectangular parallelepiped shape and includes a lens cover 19. The lens cover 19 covers a projection opening and is provided at the side portion of a front panel 12 that is a front plate of a projector housing. A plurality of intake ports 18 are formed at the front panel 12. Furthermore, although not shown, the projector 10 includes an Ir receiver that receives a control signal from a remote controller.

Moreover, a key/indicator 37 is provided on an upper panel 11 of the housing. Keys or indicators, such as a power indicator, a projection switch key, and an overheating indicator, are disposed in the key/indicator 37. The power indicator informs a user of the turning-on and turning-off of a power switch key and power. The projection switch key switches the turning-on and turning-off of projection. The overheating indicator informs a user of the overheating of a light source unit, a display element, a control circuit, or the like when the light source device, the display element, the control circuit, or the like is overheated.

In addition, an input/output connector and various terminals 20 such as a power adapter plug are provided on a back panel on the back of the housing. The input/output connector includes a USB terminal or a D-SUB terminal for inputting an image signal, an S terminal, an RCA terminal, and the like. Further, a plurality of intake ports are formed at the back panel. Meanwhile, a plurality of exhaust ports 17 are formed at a right panel that is a side plate (not shown) of the housing, and a left panel 15 that is a side plate shown in FIG. 1. Furthermore, intake ports 18 are also formed at the corner portion of the left panel 15 near the back panel. In addition, a plurality of intake ports or exhaust ports are also formed at the corner portions of the lower panel near the front panel, the back panel, the left panel, and the right panel.

Figure 2:
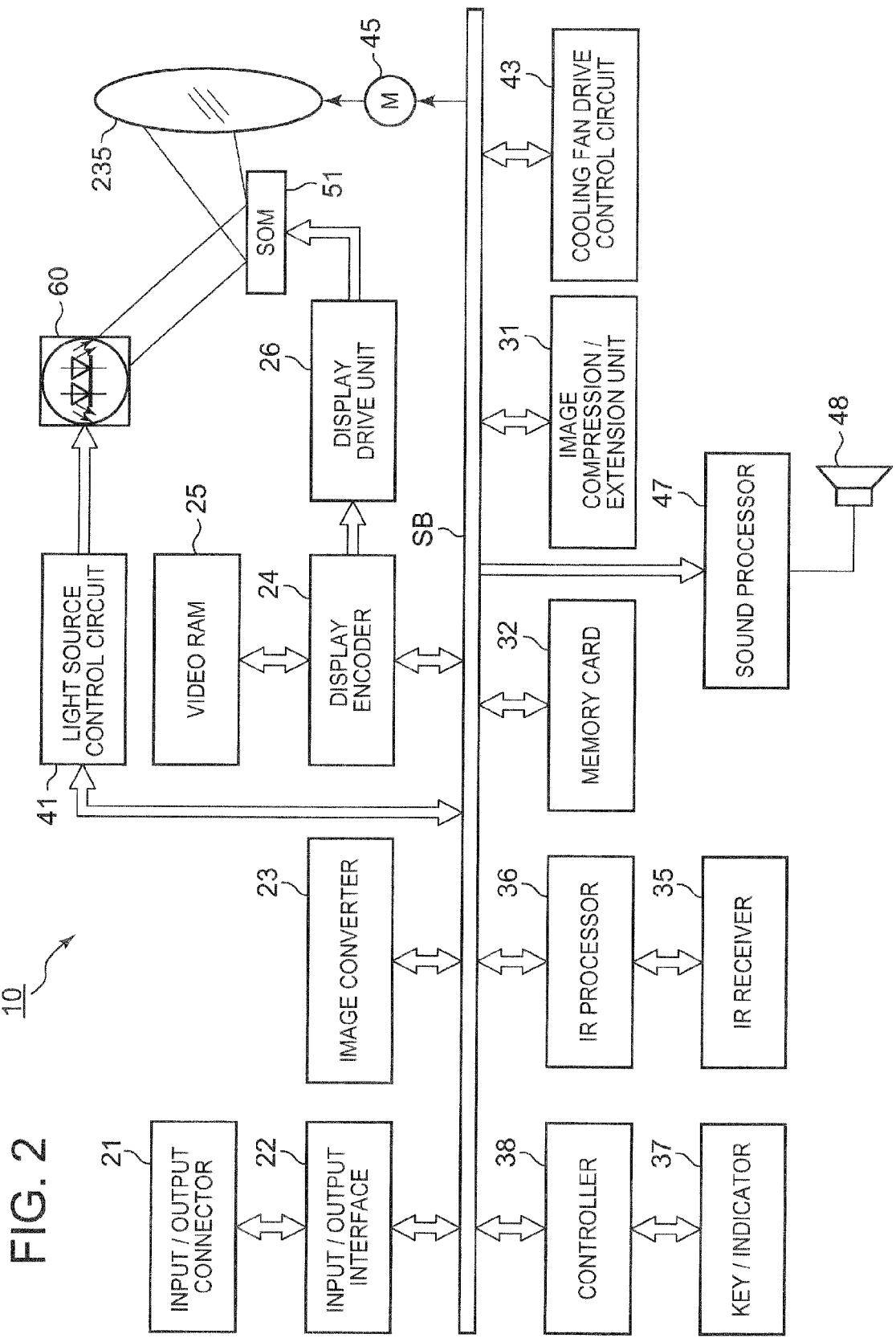
FIG. 2 is a view showing functional circuit blocks of the projector according to the embodiment of the invention.

Next, projector controller of the projector 10 will be described with reference to a block diagram of FIG. 2. The projector controller includes a controller 38, an input/output interface 22, an image converter 23, a display encoder 24, a display drive unit 26, and the like. After being converted through the input/output interface 22 and a system bus (SB) by the image converter 23 so as to be standardized to an image signal having a predetermined format suitable for display, image signals of various standards, which are input from the input/output connector 21, are output to the display encoder 24.

Further, after the display encoder 24 makes the input image signals be developed and stored in a video RAM 25, the display encoder 24 generates a video signal from the content stored in the video RAM 25 and outputs the video signal to the display drive unit 26.

The display drive unit 26 functions as display element controller; drives a display element 51, which is a spatial light modulation element (SOM), at an appropriate frame rate in accordance with the image signal output from the display encoder 24; forms an optical image by the light reflected from the display element 51 by irradiating the display element 51 with a luminous flux, which is emitted from a light source unit 60, through a light guide optical system; and projects and displays the image on a screen (not shown) through a projection-side optical system to be described below. Meanwhile, a movable lens group 235 of the projection-side optical system is driven for zoom adjustment or focus adjustment by a lens motor 45.

Further, an image compression/extension unit 31 performs a recording process for compressing data of a luminance signal and a color-difference signal of an image signal by processing, such as ADCT and Huffman coding, and sequentially writing the data in a memory card 32 formed of a detachable recording medium. Furthermore, the image compression/extension unit 31 performs a process for reading the image data recorded in the memory card 32 in a reproduction mode, extending each image data of a series of moving images by frame, outputting the image data to the display encoder 24 through the image converter 23, and allowing the moving images or the like to be displayed on the basis of the image data recorded in the memory card 32.

The controller 38 controls the operations of respective circuits of the projector 10. The controller 38 includes a CPU, or a ROM that fixedly stores operation programs such as various settings and a RAM that is used as a work memory and the like.

An operation signal of the key/indicator 37, which includes main keys, indicators, and the like, is directly sent to the controller 38. A key operation signal from the remote controller is received by an Ir receiver 35. A code signal, which is demodulated by an Ir processor 36, is output to the controller 38.

Meanwhile, a sound processor 47 is connected to the controller 38 through the system bus (SB). The sound processor 47 includes a sound source circuit such as a PCM sound source, converts sound data into analogue data in the projection mode and the reproduction mode, and amplifies and emits sound by driving a speaker 48.

Further, since the controller 38 controls a light source control circuit 41 as light source controller, the light source control circuit 41 individually controls the light emission of an excitation light irradiation device, a red light source device, and a blue light source device of the light source unit 60 so that light of a predetermined wavelength band required at the time of image generation is emitted from the light source unit 60.

Furthermore, the controller 38 makes a cooling fan drive control circuit 43 detect temperature by a plurality of temperature sensors that are provided on the light source unit 60 and the like, and makes the cooling fan drive control circuit 43 control the rotational speed of a cooling fan on the basis of the results of the temperature detection. Moreover, the controller 38 also performs a control that makes the cooling fan drive control circuit 43 continue to rotate the cooling fan by a timer or the like even after the turning-off of the power of a projector main body, a control that turns off the power of the projector main body in accordance with the result of temperature detection, and the like.

Figure 3:
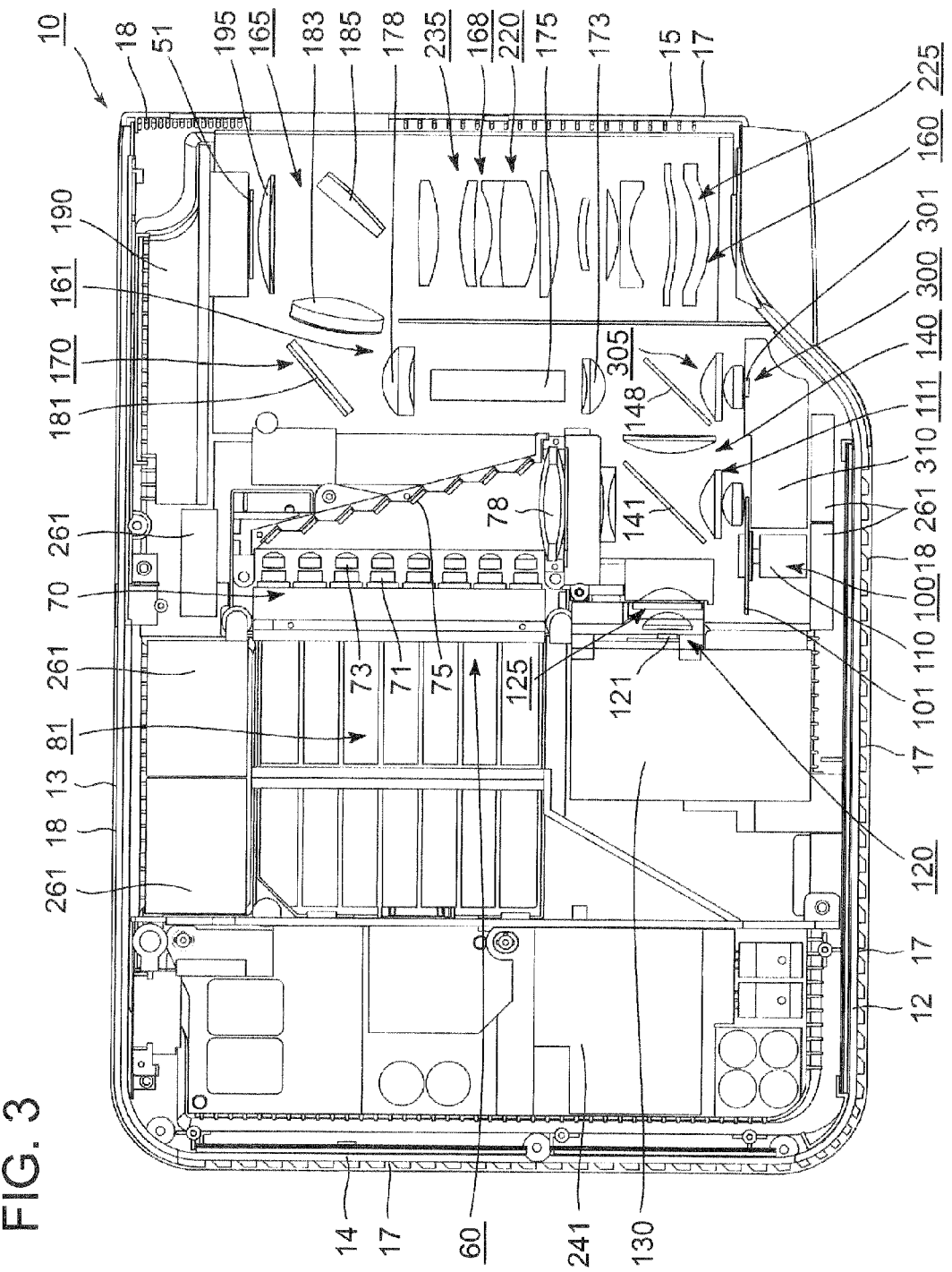
FIG. 3 is a schematic plan view showing the internal structure of the projector according to the embodiment of the invention.

Next, the internal structure of the projector 10 will be described. FIG. 3 is a schematic plan view showing the internal structure of the projector 10. As shown in FIG. 3, the projector 10 includes a control circuit board 241 near a right panel 14. The control circuit board 241 includes a power circuit block, a light source control block, and the like. Further, the projector 10 includes the light source unit 60 on the side of the control circuit board 241, that is, substantially in the middle of the projector housing. Furthermore, the projector 10 includes an optical system unit 160 between the light source unit 60 and the left panel 15.

The light source unit 60 includes an excitation light irradiation device 70, a fluorescence device 100, a blue light source device 300, a red light source device 120, and a light guide optical system 140. The excitation light irradiation device 70 is disposed near a back panel 13 substantially in the middle of the projector housing in a lateral direction. The fluorescence device 100 is disposed near the front panel 12 on the optical axis of the luminous flux emitted from the excitation light irradiation device 70. The blue light source device 300 is disposed near the front panel 12 so as to be parallel to the luminous flux emitted from the fluorescence device 100. The red light source device 120 is disposed between the excitation light irradiation device 70 and the fluorescence device 100. The light guide optical system 140 changes the optical axes of the light emitted from the fluorescence device 100, the light emitted from the red light source device 120, and the light emitted from the blue light source device 300 so that the respective optical axes become the same optical axis;

and guides each color light to an incident port of a light tunnel 175 that is a predetermined surface.

The excitation light irradiation device 70 includes excitation light sources 71, a reflecting mirror group 75, a condenser lens 78, and a heat sink 81. The excitation light sources 71 are disposed so that the optical axes of the excitation light sources 71 are parallel to the back panel 13. The reflecting mirror group 75 changes the optical axis of the light emitted from the excitation light sources 71 toward the front panel 12 by an angle of 90°. The condenser lens 78 condenses the light that is emitted from the excitation light sources 71 and reflected by the reflecting mirror group 75. The heat sink 81 is disposed between the right panel 14 and the excitation light sources 71.

The excitation light sources 71 include a total of 24 blue laser diodes that are arranged in a 3×8 matrix, and collimator lenses 73 each of which is a condenser lens converting the light emitted from each blue laser diode into parallel light is disposed on the optical axis of each of the blue laser diodes. Further, the reflecting mirror group 75 includes a plurality of reflecting mirrors that are arranged in the shape of a staircase, reduces the cross-sectional area of the luminous flux emitted from the excitation light sources 71 in one direction, and emits the luminous flux to the condenser lens 78.

Since a cooling fan 261 is disposed between the heat sink 81 and the back panel 13, the excitation light sources 71 are cooled by the cooling fan 261 and the heat sink 81. In addition, since a cooling fan 261 is disposed even between the reflecting mirror group 75 and the back panel 13, the reflecting mirror group 75 and the condenser lens 78 are cooled by the cooling fan 261.

The fluorescence device 100 includes a fluorescent wheel 101, a wheel motor 110, and a condenser lens group 111. The fluorescent wheel 101 is disposed parallel to the front panel 12, that is, orthogonal to the optical axis of the light emitted from the excitation light irradiation device 70. The wheel motor 110 rotationally drives the fluorescent wheel 101. The condenser lens group 111 condenses the luminous flux emitted from the fluorescent wheel 101 toward the back panel 13.

The fluorescent wheel 101 is a disc-shaped metal base member, and an annular fluorescence region of the fluorescent wheel 101, which emits fluorescent light of a green wavelength band by using the light emitted from the excitation light sources 71 as excitation light, is formed as a recessed portion. The fluorescent wheel 101 functions as a fluorescent plate that receives the excitation light and emits fluorescent light. Further, mirror processing is performed on the surface of the fluorescent wheel 101, which includes the fluorescence region and faces the excitation light sources 71, by silver deposition or the like. Accordingly, a reflecting surface, which reflects light, is formed, and a green phosphor layer is formed on the reflecting surface.

Moreover, the light emitted from the excitation light irradiation device 70, to which the green phosphor layer of the fluorescent wheel 101 is irradiated, excites a green phosphor of the green phosphor layer. Then, the luminous flux, which is fluorescently emitted in all the directions from the green phosphor, is directly emitted toward the excitation light sources 71 or is emitted toward the excitation light sources 71 after being reflected by the reflecting surface of the fluorescent wheel 101. Further, the excitation light, which is emitted to the metal base member without being absorbed in the phosphor of the phosphor layer, is reflected by the reflecting surface, enters the phosphor layer again, and excites the phosphor. Accordingly, it is possible to increase the use efficiency of the excitation light, which is emitted from the excitation light sources 71, and to emit brighter light by forming the surface of the recessed portion of the fluorescent wheel 101 as a reflecting surface.

Meanwhile, among the excitation light, which is reflected toward the phosphor layer by the reflecting surface of the fluorescent wheel 101, the excitation light, which is emitted toward the excitation light sources 71 without being absorbed in the phosphor, is transmitted through a first dichroic mirror 141 to be described below and fluorescent light is reflected by the first dichroic mirror 141. Accordingly, the excitation light is not emitted to the outside. Moreover, since a cooling fan 261 is disposed between the wheel motor 110 and the front panel 12, the fluorescent wheel 101 is cooled by the cooling fan 261.

The red light source device 120 includes a red light source 121 and a condenser lens group 125. The red light source 121 is disposed so that the optical axis of the red light source 121 is parallel to the optical axes of the excitation light sources 71. The condenser lens group 125 condenses the light emitted from the red light source 121. Further, the red light source device 120 is disposed so that the optical axis of the red light source device 120 crosses the optical axis of the light emitted from the excitation light irradiation device 70 and the optical axis of the light of a green wavelength band emitted from the fluorescent wheel 101. Furthermore, the red light source 121 is a red light-emitting diode as a semiconductor light-emitting element that emits light of a red wavelength band. In addition, the red light source device 120 includes a heat sink 130 that is disposed close to the right panel 14 on one side of the red light source 121. Moreover, since a cooling fan 261 is disposed between the heat sink 130 and the front panel 12, the red light source 121 is cooled by the cooling fan 261.

The blue light source device 300 includes a blue light source 301 and a condenser lens group 305. The blue light source 301 is disposed so that the optical axis of the blue light source 301 is parallel to the optical axis of the light emitted from the fluorescence device 100. The condenser lens group 305 condenses the light emitted from the blue light source 301. Further, the blue light source device 300 is disposed so that the optical axis of the blue light source device 300 crosses the optical axis of the light emitted from the red light source device 120. Furthermore, the blue light source 301 is a blue light-emitting diode as a semiconductor light-emitting element that emits light of a blue wavelength band. In addition, the blue light source device 300 includes a heat sink 310 that is disposed close to the front panel 12 on one side of the blue light source 301. Moreover, since a cooling fan 261 is disposed between the heat sink 310 and the front panel 12, the blue light source 301 is cooled by the cooling fan 261.

Further, the light guide optical system 140 includes a condenser lens that condenses the luminous fluxes of red, green, and blue wavelength bands; a dichroic mirror that changes the optical axes of the luminous fluxes of the respective color wavelength bands into the same optical axis; and the like. Specifically, the first dichroic mirror 141, which transmits the light of blue and red wavelength bands and changes the optical axis of green light toward the left panel 15 by an angle of 90° through the reflection of the light of a green wavelength band, is disposed at a position where the optical axes of the light of a blue wavelength band emitted from the excitation light irradiation device 70 and the light of a green wavelength band emitted from the fluorescent wheel 101 cross the optical axis of the light of a red wavelength band emitted from the red light source device 120.

Furthermore, a second dichroic mirror 148, which transmits the light of a blue wavelength band and changes the optical axes of green light and red light toward the back panel 13 by an angle of 90° through the reflection of the light of green and red wavelength bands, is disposed at a position where the optical axis of the light of a blue wavelength band emitted from the blue light source device 300 crosses the optical axis of the light of a red wavelength band emitted from the red light source device 120. Moreover, a condenser lens is disposed between the first and second dichroic mirrors 141 and 148. In addition, a condenser lens 173, which condenses the light source light to the incident port of the light tunnel 175, is disposed near the light tunnel 175.

The optical system unit 160 is formed in a substantially U shape by three blocks, that is, an illumination-side block 161 that is positioned on the left side of the excitation light irradiation device 70, an image generating block 165 that is positioned near a position where the back panel 13 and the left panel 15 cross each other, and a projection-side block 168 that is positioned between the light guide optical system 140 and the left panel 15.

The illumination-side block 161 includes a part of a light source-side optical system 170 that guides the light source light, which is emitted from the light source unit 60, to a display element 51 of the image generating block 165. As the light source-side optical system 170 of the illumination-side block 161, there are a light tunnel 175 that changes the luminous flux emitted from the light source unit 60 into a luminous flux having uniform intensity distribution, a condenser lens 178 that condenses the light emitted from the light tunnel 175, an optical axis changing mirror 181 that changes the optical axis of the luminous flux emitted from the light tunnel 175 toward the image generating block 165, and the like.

The image generating block 165 includes a condenser lens 183 and an irradiation mirror 185 as the light source-side optical system 170. The condenser lens 183 condenses the light source light, which is reflected by the optical axis changing mirror 181, to the display element 51. The irradiation mirror 185 emits the luminous flux, which is transmitted through the condenser lens 183, to the display element 51 at a predetermined angle. Moreover, the image generating block 165 includes a DMD as the display element 51, and a heat sink 190, which cools the display element 51, is disposed between the display element 51 and the back panel 13. Accordingly, the display element 51 is cooled by the heat sink 190. Further, a condenser lens 195 as a projection-side optical system 220 is disposed near the front side of the display element 51.

The projection-side block 168 includes a lens group of the projection-side optical system 220 projecting the light, which is reflected by the display element 51, on a screen. The projection-side optical system 220 is formed of a varifocal lens that includes a stationary lens group 225 built in a stationary lens barrel and a movable lens group 235 built in a movable lens barrel and has a zoom function. The projection-side optical system 220 can perform zoom adjustment or focus adjustment by moving the movable lens group 235 with a lens motor.

Meanwhile, the excitation light sources 71 of a light source device include a total of 24 blue laser diodes that are arranged in a 3×8 matrix as described above.

Figure 4:
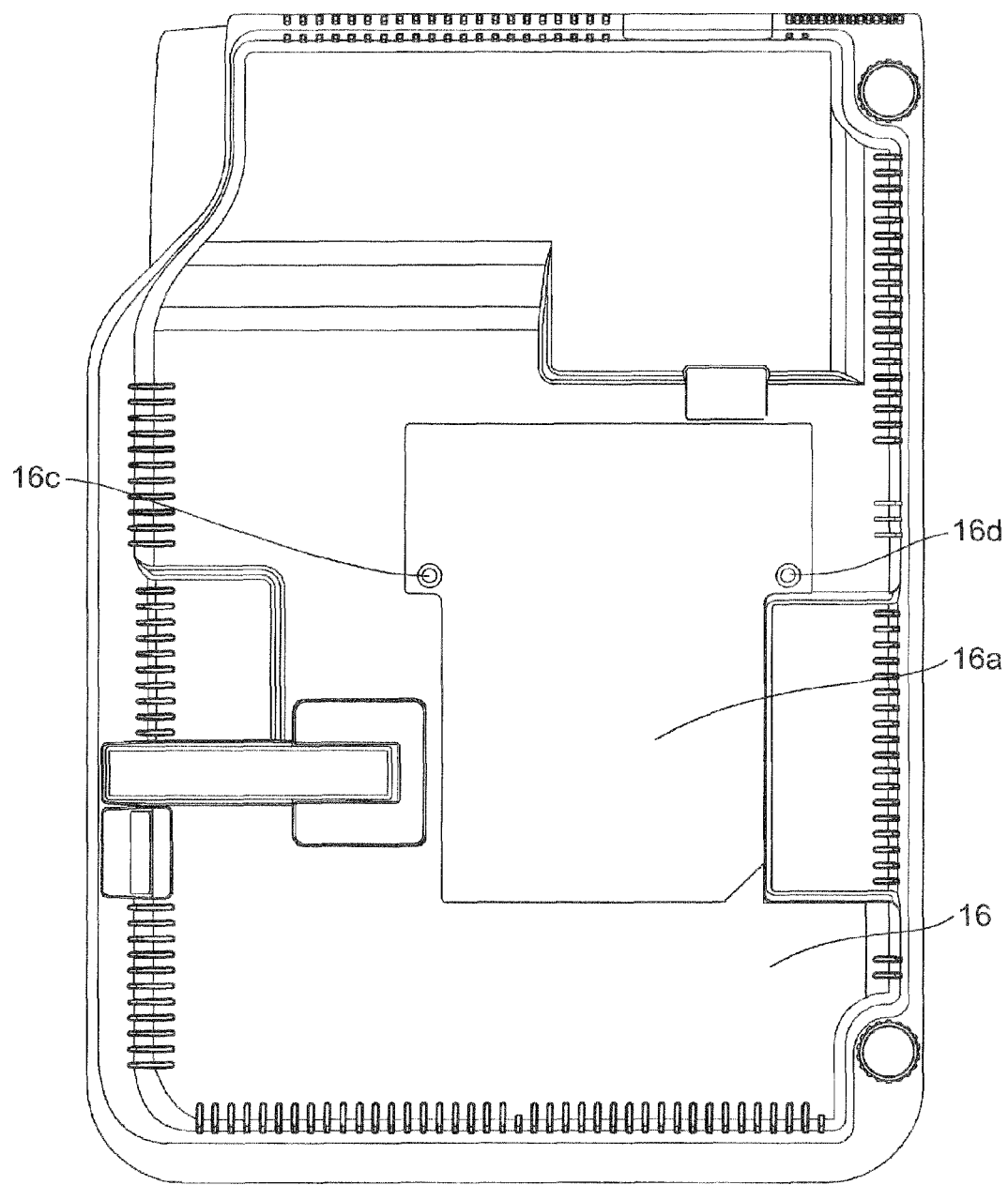
FIG. 4 is a bottom view showing a state where a bottom panel lid of the projector according to the embodiment of the invention is mounted.
Figure 5:
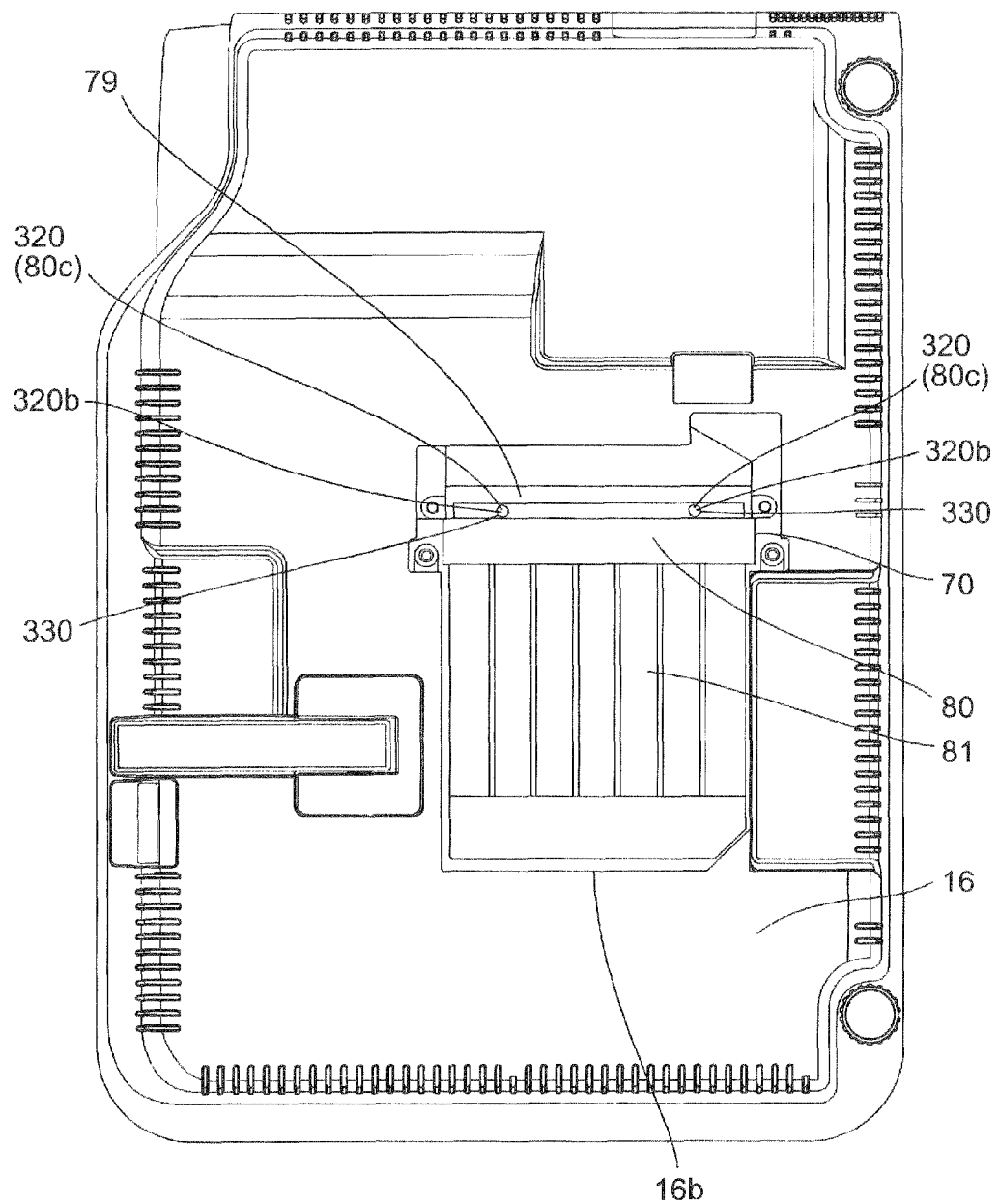
FIG. 5 is a bottom view showing a state where a light source device from which the bottom panel lid of the projector has been separated is exposed to the outside.

Next, the bottom structure of the projector 10 will be described. FIG. 4 is a bottom view showing a state where a bottom panel lid 16a of the projector 10 according to the embodiment of the invention is mounted. FIG. 5 is a bottom view showing a state where the bottom panel lid 16a of the projector 10 has been separated, and the excitation light irradiation device 70, which is a light source device, is exposed to the outside.

As shown in FIGS. 4 and 5, an opening portion 16b and a bottom panel lid 16a are provided near the center of the bottom panel 16 of the housing of the projector 10 so as to correspond to the position of the excitation light irradiation device 70. In detail, the bottom panel lid 16a, which is a lid part capable of being mounted at the opening portion 16b, is fixed to the opening portion 16b of the bottom panel 16 by screws 16c and 16d. The opening portion 16b and the bottom panel lid 16a allow the maintenance of the excitation light irradiation device 70.

Figure 6:
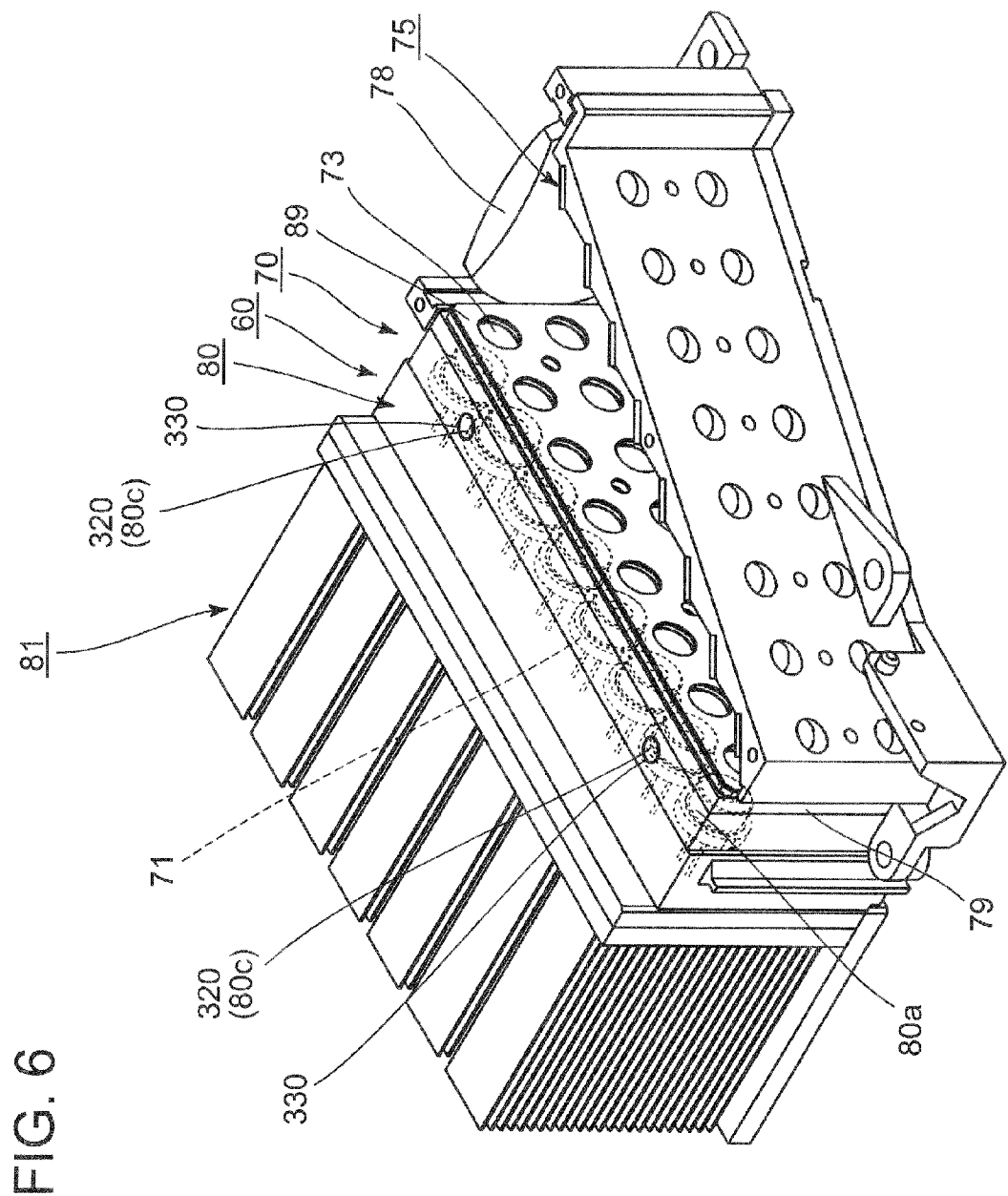
FIG. 6 is a perspective view of the light source device according to the embodiment of the invention as viewed from the bottom side.
Figure 7:
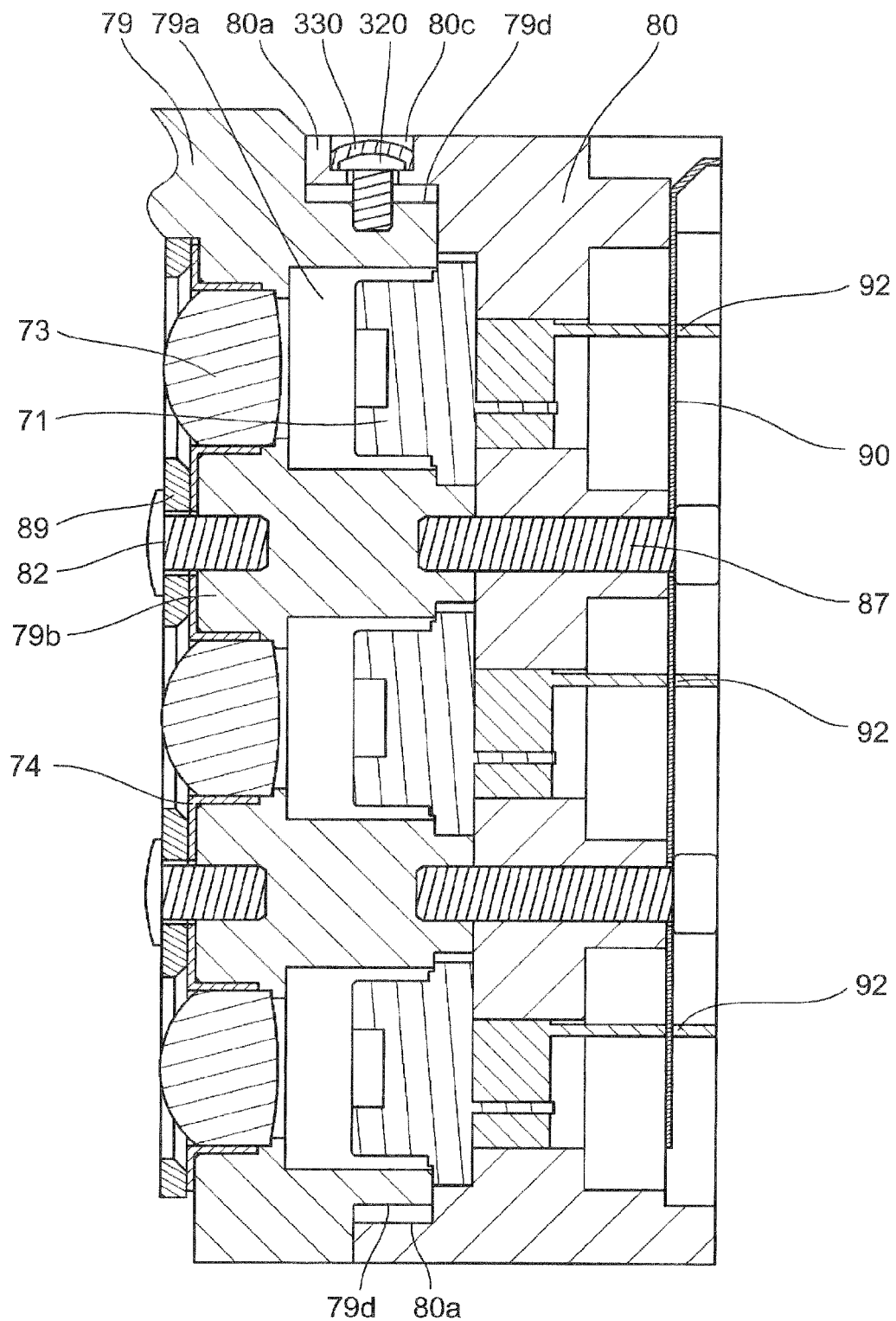
FIG. 7 is a cross-sectional view of the light source device according to the embodiment of the invention.

The excitation light irradiation device 70, which is the light source device of the projector 10, will be described. FIG. 6 is a perspective view of the light source device according to the embodiment of the invention as seen from the bottom side. FIG. 7 is a cross-sectional view of the light source device according to the embodiment of the invention. Meanwhile, the bottom side and upper side of the excitation light irradiation device 70 correspond to the upper and lower sides shown in FIG. 7, respectively. Further, FIG. 7 shows the cross-section of the excitation light irradiation device 70 that passes through the respective screws.

As shown in FIGS. 6 and 7, the excitation light irradiation device 70 includes the excitation light sources 71 as light sources, the collimator lenses 73 as condenser lenses that improve the directivity of the light emitted from the excitation light sources 71, lens mounting frames 74, a lens support 79 as a second support that supports the collimator lenses 73, a light source support 80 as a first support, and a press plate 89. Meanwhile, the excitation light irradiation device 70 according to this embodiment includes screws 320 that are locking members.

Each of the collimator lenses 73 is a condenser lens that converts the light emitted from blue laser diodes, which are the excitation light sources 71, into parallel light. The lens mounting frames 74 are integrated with the collimator lenses 73 in advance, and are mounting frames that are fixed to the peripheries of the collimator lenses 73 by an adhesive or the like as shown in FIG. 7. The adjustment of the positions of the collimator lenses 73 is performed by the movement of the lens mounting frames 74 caused by the pressing of the peripheries of the lens mounting frames 74 that are integrated with the collimator lenses 73 by fixing the peripheries of the collimator lenses 73 to the lens mounting frames 74 with an adhesive or the like. Accordingly, it is possible to prevent the lenses themselves from being damaged.

The lens support 79 is a supporting member made of a heat resistant resin. As shown in FIG. 7, the lens support 79 includes a plurality of hole portions 79a and supports the lens mounting frames 74 so that the lens mounting frames 74 integrated with the collimator lenses 73, which are condenser lenses, are disposed in lens frame holes 79b and the lens mounting frames 74 can be moved in an adjustable range in a direction orthogonal to the optical axis. The excitation light sources 71 are disposed in the hole portions 79a of the lens support 79, respectively.

Further, the lens support 79 is adapted to receive first protruding portions formed at the upper peripheries of the lens mounting frames 74 so that the lens mounting frames 74 disposed in the lens frame holes 79b are not moved downward along the optical axes. Furthermore, the first protruding portions formed at the upper peripheries of the lens mounting frames 74 are pressed from above by the press plate 89 so that the lens mounting frames 74 are not moved upward along the optical axes at the time of adjustment. That is, it is possible to adjust the optical axes of the collimator lenses 73 by the above-mentioned structure.

The light source support 80 is a heat radiating member made of aluminum or the like, and supports the excitation light sources 71. In detail, the light source support 80 is fitted to the lens support 79 and supports the excitation light sources 71 between the lens support 79 and itself as shown in FIG. 7. Further, the light source support 80 and the lens support 79 are integrated with each other by being fixed to each other by screws 87 while supporting the excitation light sources 71. For example, a flexible board 90, which is electrically connected to the controller 38, is disposed on the back side of the light source support 80, and the flexible board 90 is electrically connected to the excitation light sources 71 by lead wire terminals 92. When the optical axes of the excitation light sources 71 and the collimator lenses 73 have been adjusted, the excitation light sources 71 and the collimator lenses 73 are supported by the lens support 79 and the light source support 80.

Figure 8:
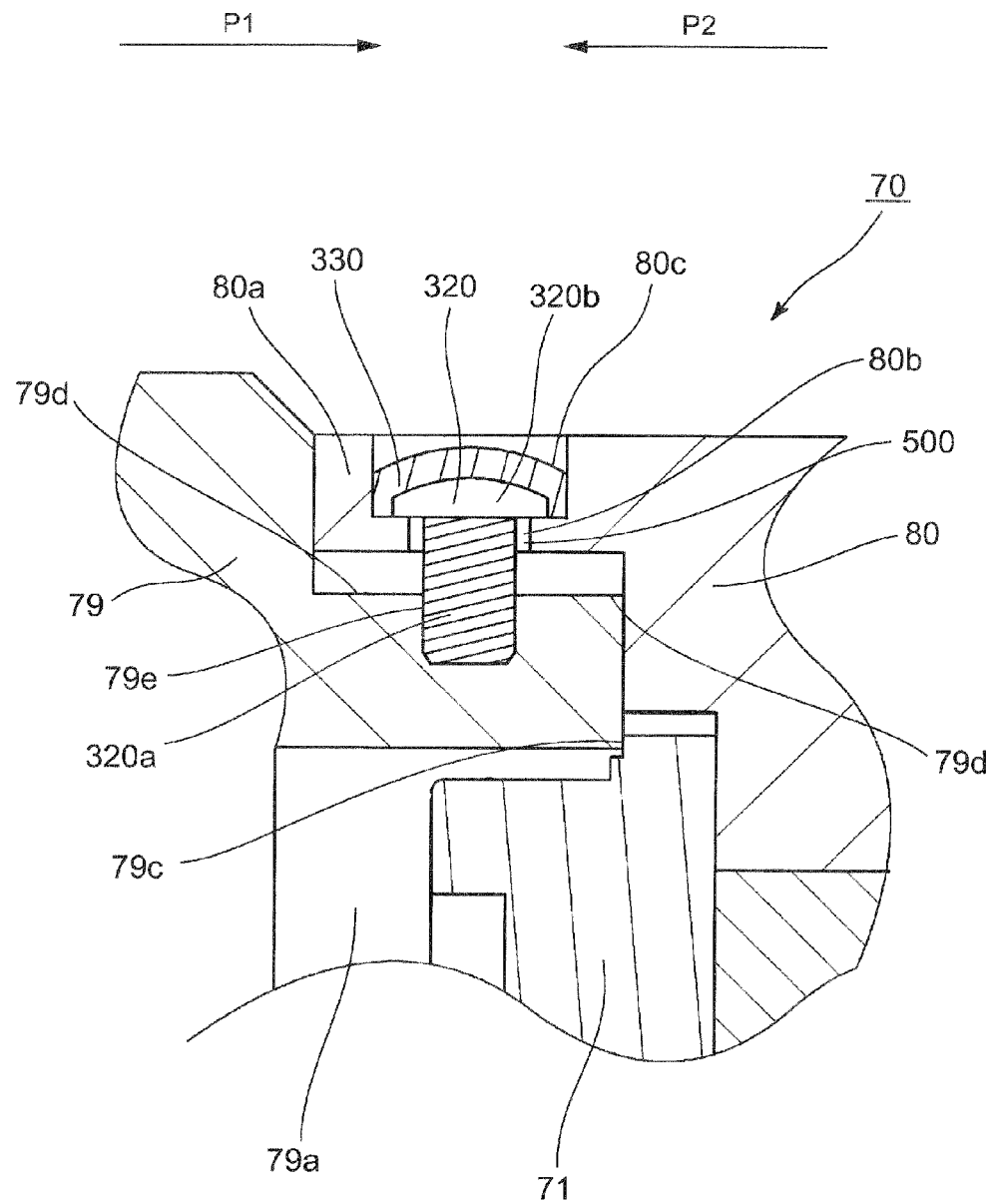
FIG. 8 is an enlarged cross-sectional view of the main parts of the light source device according to the embodiment of the invention.

Next, a mechanism, which prevents the separation of the excitation light sources 71 of the projector 10 according to the embodiment of the invention, will be described in detail below. FIG. 8 is an enlarged cross-sectional view of main parts of the excitation light irradiation device 70 that is the light source device according to the embodiment of the invention. Each of the excitation light sources 71 is supported between the light source support 80 and an end face 79c of the lens support 79.

The excitation light irradiation device 70 includes a first protruding portion 80a that protrudes from the light source support 80 as the first support toward the lens support 79 as the second support or protrudes from the lens support 79 toward the light source support 80; includes a second protruding portion 79d that includes a notch receiving the first protruding portion 80a and is formed at the lens support 79 or the light source support 80. The first protruding portion 80a includes through holes 80b that pass through the first protruding portion 80a from the surface to the back surface and recessed hole portions 80c that have a diameter larger than the diameter of the through holes 80b so as to receive head portions 320b of the screws 320 as the locking members formed on the surface of the first protruding portion 80a.

In detail, in the excitation light irradiation device 70 according to this embodiment, as shown in FIGS. 6, 7, and 8, the light source support 80 as the first support includes the first protruding portion 80a that is formed at the circumference thereof and protrudes along a direction (P2) where the lens support 79 and the light source support 80 are fitted to each other. The recessed hole portions 80c, which receive the head portions 320b of the screws 320 as the locking members, are formed on the surface of the first protruding portion 80a. Specifically, the recessed hole portions 80c, which can receive the screws 320, are formed on one surface of the lower portion of the first protruding portion 80a close to the light source support 80. Further, as shown in FIGS. 5 and 6, two recessed hole portions 80c are formed at the first protruding portion 80a near both end portions of the first protruding portion 80a.

Further, the through holes 80b, which pass through the first protruding portion 80a from the bottom portions of the recessed hole portions 80c to the back surface of the first protruding portion 80a and have a small diameter, are formed at the recessed hole portions 80c of the light source support 80, respectively. Specifically, the through holes 80b are formed so as to pass through the first protruding portion 80a from the bottom portions of the recessed hole portions 80c to the back surface of the first protruding portion 80a along a direction orthogonal to the direction (P2) where the lens support 79 and the light source support 80 are fitted to each other. The through holes 80b are formed so as to have a diameter larger than the diameter of a main body portion 320a of each of the screws 320 as the locking members and smaller than the diameter of each of the head portions 320b of the screws 320.

The second protruding portion 79d, which includes a stepped notch receiving the first protruding portion 80a, is formed at the circumference of the lens support 79 as the second support. While being fitted to the first protruding portion 80a of the light source support 80, the second protruding portion 79d of the lens support 79 includes receiving holes 79e at the positions corresponding to the through holes 80b along the direction orthogonal to the direction (P2) where the lens support 79 and the light source support 80 are fitted to each other.

As shown in FIG. 8, the screw 320 includes the rod-like main body portion 320a and the head portion 320b. While the first protruding portion 80a of the light source support 80 is fitted to the second protruding portion 79d of the lens support 79, the main body portion 320a passes through the through hole 80b of the first protruding portion 80a and an end of the main body portion 320a is inserted and fitted into the receiving hole 79e of the second protruding portion 79d along the direction orthogonal to the direction (P2) where the lens support 79 and the light source support 80 are fitted to each other.

As shown in FIG. 8, the head portion 320b of the screw 320 is disposed in the recessed hole portion 80c formed at the first protruding portion 80a and is embedded in the recessed hole portion 80c so as to be covered with a sealant 330 filled in the recessed hole portion 80c. Examples of the sealant 330 may include an adhesive.

Further, it is preferable that the screw 320 be fixed to one of the through hole 80b of the first protruding portion 80a of the light source support 80 and the receiving hole 79e of the second protruding portion 79d of the lens support 79 and be loosely fitted to the other thereof. This is a structure where a force is applied to only one of the light source support 80 and the lens support 79 when the screw 320 is mounted on the excitation light irradiation device 70.

For example, as a modification, in a structure where a force is applied to both the through hole 80b and the receiving hole 79e when a screw 320 is mounted, relatively large relative positional deviation may occur between the light source support 80 and the lens support 79. When this positional deviation occurs, the optical axes of the collimator lenses 73 and the excitation light sources 71 need to be adjusted again.

In the excitation light irradiation device 70 according to the invention, a force is applied to only one of the light source support 80 and the lens support 79 when the screw 320 is mounted. Accordingly, relative positional deviation does not occur between the light source support 80 and the lens support 79. For this reason, it is possible to prevent the optical axes of the collimator lenses 73 and the excitation light sources 71 from deviating from each other.

Further, as shown in FIG. 8, the screw 320 is fixed to the receiving hole 79e of the second protruding portion 79d of the lens support 79 and loosely fitted to the through hole 80b of the first protruding portion 80a of the light source support 80, and a threaded engagement portion, which is a female screw with which a male screw formed on the main body portion 320a of the screw 320 is threadedly engaged, is formed at the receiving hole 79e of the lens support 79. That is, an end of the male screw of the main body portion 320a is threadedly engaged with the female screw of the receiving hole 79e of the lens support 79, so that the screw 320 is fixed to the lens support 79.

Furthermore, in the first protruding portion 80a of this embodiment, the inner diameter of the through hole 80b is slightly larger than the outer diameter of the main body portion 320a of the screw 320 as shown in FIG. 8. For this reason, when the screw 320 is mounted, a gap 500 is formed between the main body portion 320a of the screw 320 and the through hole 80b. Accordingly, the screw 320 is loosely fitted to the through hole 80b. That is, when the screw 320 is mounted, a force is not applied to the light source support 80.

Figure 9:
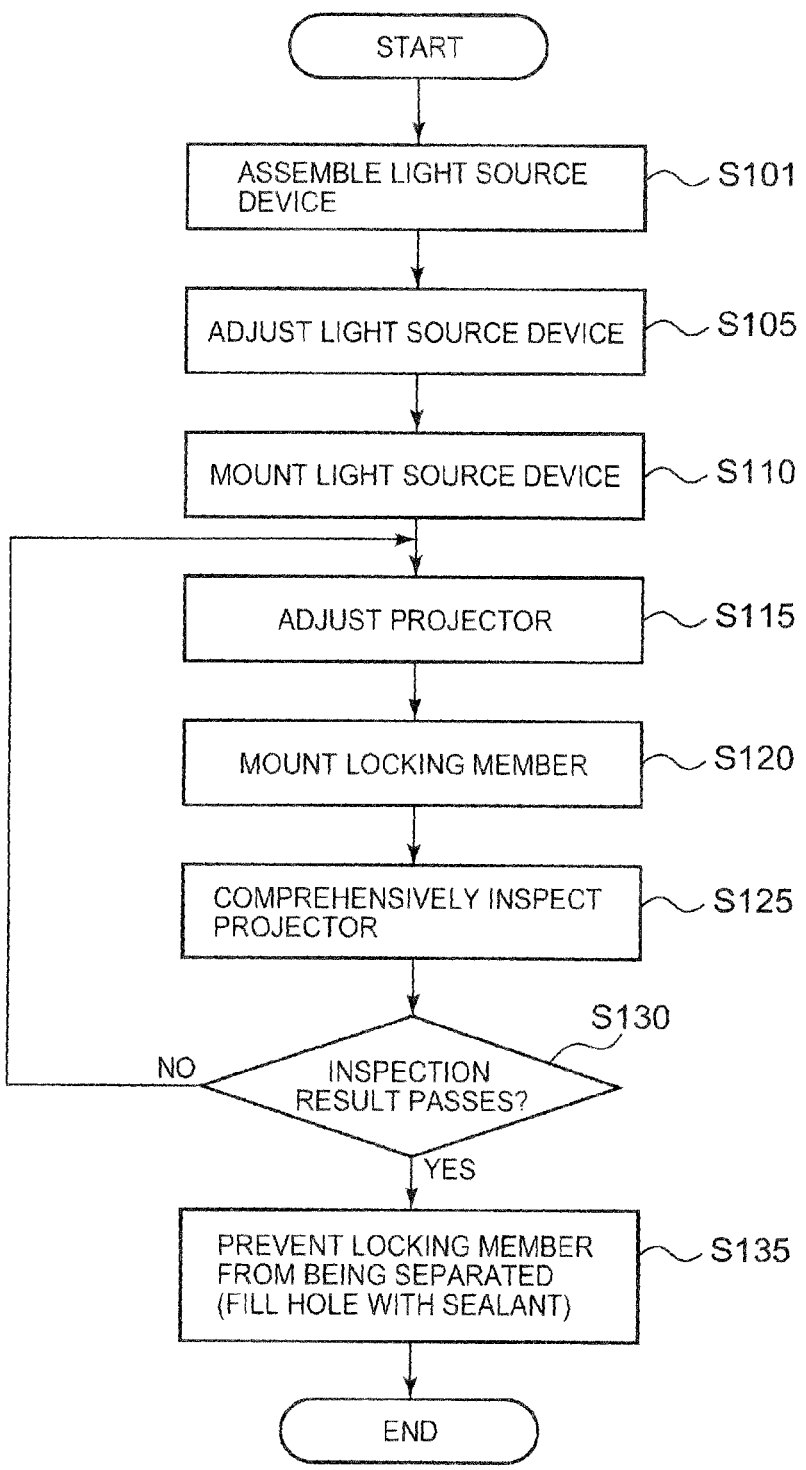
FIG. 9 is a flowchart illustrating a method of manufacturing the projector according to the embodiment of the invention.

Next, a method of assembling the excitation light irradiation device 70, which is the light source device according to this embodiment, in the projector 10 will be described. FIG. 9 is a flowchart illustrating a method of manufacturing the projector 10 according to the embodiment of the invention. FIGS. 10A to 10D are views illustrating the assembly order of the excitation light irradiation device 70 that is the light source device according to the embodiment of the invention.

Figure 10A:
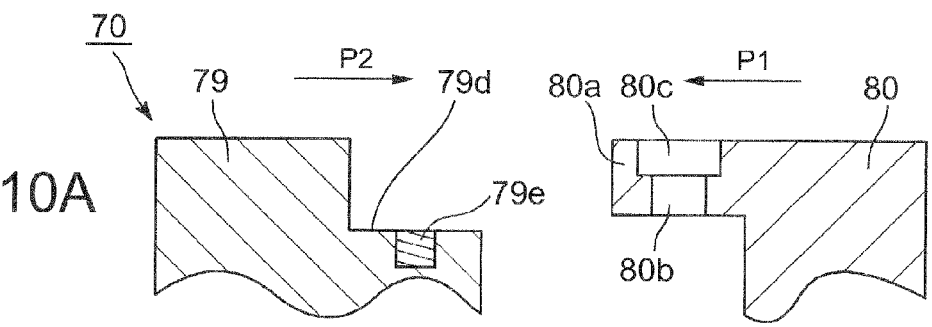
FIGS. 10A to 10D are views illustrating the assembly order of the light source device according to the embodiment of the invention.
Figure 10B:
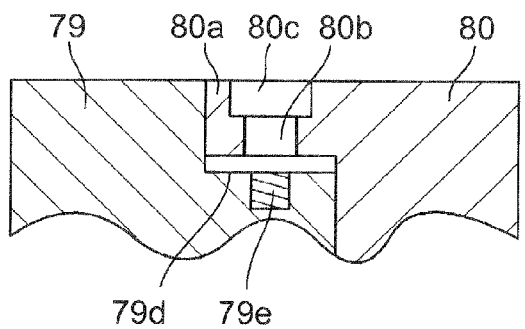

In Step S101, a process for assembling the excitation light irradiation device 70, which is the light source device, is performed. In detail, the collimator lenses 73 are mounted on the lens support 79 and the light source support 80 is mounted on the lens support 79. Then, as shown in FIGS. 10A and 10B, the light source support 80 and the lens support 79 are moved in the fitting directions (P1 and P2), respectively, the first protruding portion 80a of the light source support 80 and the second protruding portion 79d of the lens support 79 are fitted to each other, and the light source support 80 and the lens support 79 are fixed to each other by the screws 87 so as to be integrated with each other.

In Step S105, a process for adjusting the excitation light irradiation device 70 is performed. In detail, in the state shown in FIG. 10B, the optical axes of the excitation light sources 71 and the optical axes of the collimator lenses 73 are adjusted so as to be aligned with each other by the adjustment of the optical axes of the collimator lenses 73 supported by the lens support 79. Then, while the optical axes of the excitation light sources 71 and the optical axes of the collimator lenses 73 are aligned with each other, the collimator lenses 73 are fixed to the lens support 79 by the press plate 89.

Meanwhile, in the above-mentioned embodiment, the optical axes of the collimator lenses 73 and the optical axes of the excitation light sources 71 have been adjusted so as to be aligned with each other after the lens support 79 and the light source support 80 are fixed to each other by the screws 87. However, the invention is not limited to this embodiment. For example, the lens support 79 and the light source support 80 may be fixed to each other by the screws 87 after the optical axes of the collimator lenses 73 and the optical axes of the excitation light sources 71 are adjusted so as to be aligned with each other.

In Step S110, a process for mounting the excitation light irradiation device 70, where the light source support 80 and the lens support 79 have been fixed to each other by the screws 87, on the housing of the projector 10 is performed. In detail, the excitation light irradiation device 70 is assembled in the housing of the projector 10 at a predetermined position and is fixed to the housing.

In Step S115, a process for adjusting the optical property of the projector 10 is performed. In detail, for example, the adjustment of the optical properties of the optical system unit 160, which includes the light guide optical system 140, the light source-side optical system 170, the projection-side optical system 220; and the like, the display element 51, the excitation light irradiation device 70 and the like is performed as the adjustment of the optical property of the projector 10.

Figure 10C:
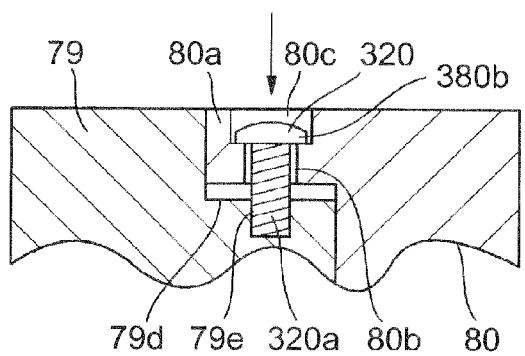

In Step S120, a process for mounting the screws 320, which are the locking member, is performed. In detail, as shown in FIG. 10C, the screws 320 pass through the through holes 80b of the first protruding portion 80a of the light source support 80 from the opening portion 16b of the housing and are inserted and fixed to the receiving holes 79e of the second protruding portion 79d of the lens support 79.

In Step S125, the comprehensive inspection and final adjustment of the entire operation of the overall operation of the projector 10 in which the excitation light irradiation device 70 has been assembled are performed. In detail, for example, whether illuminance or the like caused by the projector 10 satisfies a reference level is checked.

In Step S130, whether a product is an acceptable product satisfying a prescribed reference level is discerned as a result of the comprehensive inspection. If the prescribed reference level is satisfied as a result of the comprehensive inspection, the process proceeds to Step S135.

Figure 10D:
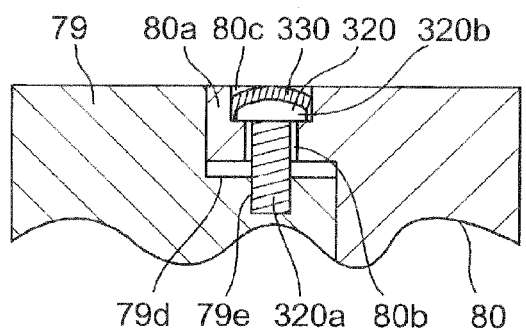

In Step S135, a process for preventing the screws 320 from being separated from the excitation light irradiation device 70 of the projector 10 is performed. In detail, as shown in FIGS. 4 and 5, the bottom panel lid 16a of the housing is separated and the head portions 320b of the screws 320 of the excitation light irradiation device 70 are exposed to the opening portion 16b. Then, as shown in FIGS. 10D and 8, the recessed hole portions 80c of the first protruding portion 80a are filled with an adhesive as the sealant 330 and the head portions 320b are embedded in the recessed hole portions 80c. The sealant 330 is hardened after a predetermined time, so that the screws 320 are not easily separated. After that, the bottom panel lid 16a is fixed to the opening portion 16b by the screws 16c and 16d.

In this way, since the screws 320 are loosely fitted to the through holes 80b of the first protruding portion 80a and fixed to the receiving holes 79e of the second protruding portion 79d as shown in FIG. 8, the light source support 80 and the lens support 79 are not easily separated from each other. Accordingly, the excitation light irradiation device 70 has a structure where the excitation light sources 71 are not easily taken out.

In detail, for example, even when an external force is applied in a direction where the light source support 80 and the lens support 79 are separated from each other, substantially rod-like screws 320 are loosely fitted to the through holes 80b of the first protruding portion 80a and fixed to the receiving holes 79e of the second protruding portion 79d along a direction orthogonal to the direction where the light source support 80 and the lens support 79 are separated from each other while the first protruding portion 80a is fitted to the second protruding portion 79d. Accordingly, the light source support 80 and the lens support 79 are not easily separated from each other.

Further, it is preferable that a positional relationship between the screw 87 and the mounting hole for the screw 87 be adapted to finely adjust an optical axis when the excitation light irradiation device 70 has a structure where, for example, a gap for fine adjustment of an optical axis is formed between the first protruding portion 80a of the light source support 80 and the second protruding portion 79d of the lens support 79 as shown in FIG. 10D.

Furthermore, if the light source support 80 and the lens support 79 are fixed to each other by the application of an adhesive having high flowability in the gap between the above-mentioned light source support 80 and the lens support 79, it is possible to prevent the looseness between the light source support 80 and the lens support 79 and to make the separation of the excitation light sources 71, which is performed after the separation of the light source support 80 from the lens support 79, not easy.

Moreover, if a reference level is not satisfied as a result of the inspection of the operation in Step S130, a predetermined arrangement process is performed.

Figure 11:
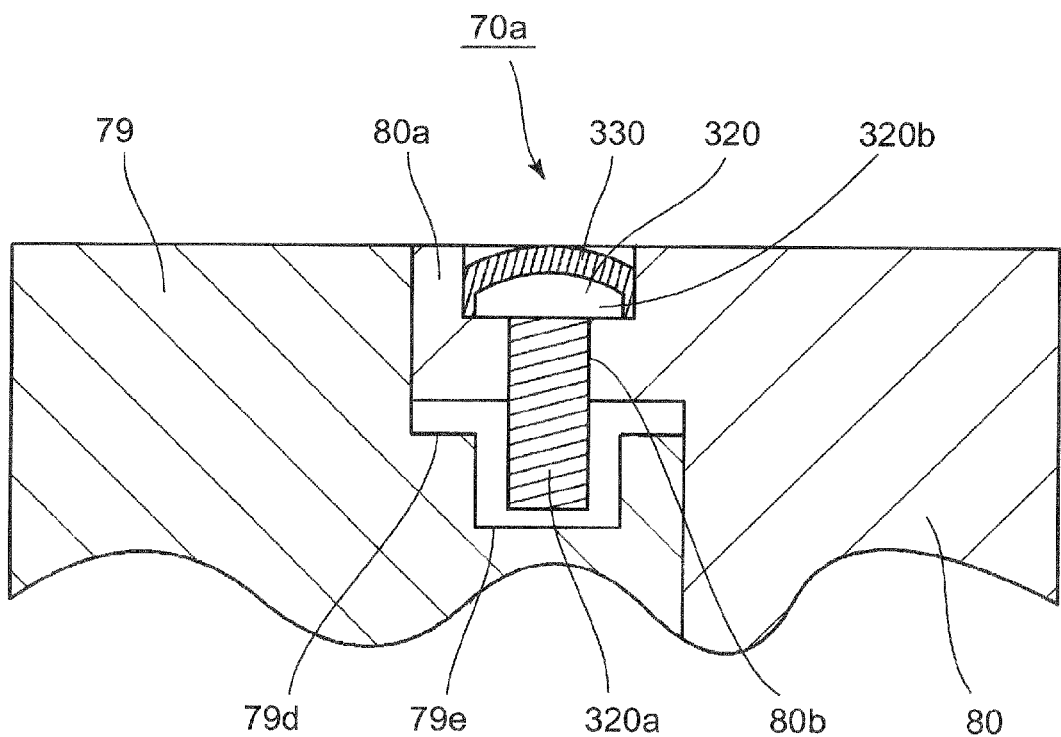
FIG. 11 is an enlarged cross-sectional view of the main parts of a light source device according to a modification of the embodiment of the invention.

Next, a light source device according to a modification of the embodiment of the invention will be described. FIG. 11 is an enlarged cross-sectional view of main parts of a light source device according to a modification of the embodiment of the invention. The description of the same structure and advantages as those of the embodiment shown in FIGS. 7 and 8 will be omitted, and the differences between the embodiment and a modification will be described.

As shown in FIG. 11, in an excitation light irradiation device 70a as a light source device, a light source support 80, which is a first support, includes a first protruding portion 80a. A lens support 79, which is a second support, includes a second protruding portion 79d. The first protruding portion 80a is adapted so as to form the side of an opening portion 16b of a housing with respect to the second protruding portion 79d. A screw 320 is fixed to a through holes 80b of the first protruding portion 80a and loosely fitted to a receiving hole 79e of the second protruding portion 79d. In detail, a threaded engagement portion, which is a female screw, is formed at the through hole 80b of the first protruding portion 80a, and a male screw of a main body portion 320a of the screw 320 is threadedly engaged with the threaded engagement portion. That is, the screw 320 passes through and is fixed to the through hole 80b and loosely fitted to the receiving hole 79e.

Since the screw 320 is fixed to the through hole 80b of the first protruding portion 80a and loosely fitted to the receiving hole 79e of the second protruding portion 79d in a projector 10 employing the above-mentioned excitation light irradiation device 70a, it is possible to prevent excitation light sources 71 of the excitation light irradiation device 70a, which is provided in a projector housing, from being separated so that the excitation light sources may be used for other purposes, by a simple structure without troublesome processes at the time of manufacture.

Figure 12:
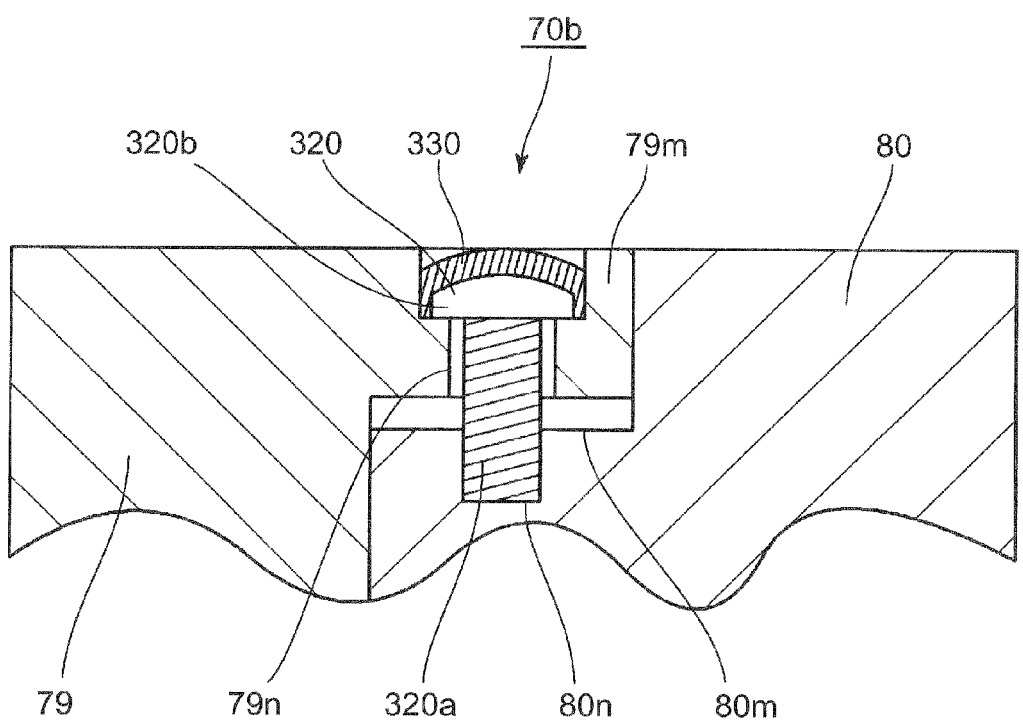
FIG. 12 is an enlarged cross-sectional view of the main parts of a light source device according to another modification of the embodiment of the invention.

Next, a light source device according to another modification of the embodiment of the invention will be described. FIG. 12 is an enlarged cross-sectional view of main parts of a light source device according to another modification of the embodiment of the invention. The description of the same structure and advantages as those of the embodiment shown in FIGS. 7 and 8 will be omitted, and the differences between the embodiment and another modification will be described.

As shown in FIG. 12, in an excitation light irradiation device 70b as a light source device, a lens support 79, which is a second support, includes a first protruding portion 79m. A light source support 80, which is a first support, includes a second protruding portion 80m. The first protruding portion 79m is adapted so as to form the side of an opening portion 16b of a housing with respect to the second protruding portion 80m. A screw 320 is loosely fitted to a through hole 79n of the first protruding portion 79m and fixed to a receiving hole 80n of the second protruding portion 80m. In detail, a threaded engagement portion, which is a female screw, is formed at the receiving hole 80n of the second protruding portion 80m, and a male screw of a main body portion 320a of the screw 320 is threadedly engaged with the threaded engagement portion.

Since the screw 320 is loosely fitted to the through hole 79n of the first protruding portion 79m and fixed to the receiving hole 80n of the second protruding portion 80m in a projector 10 employing the above-mentioned excitation light irradiation device 70b, it is possible to prevent excitation light sources 71 of the excitation light irradiation device 70b, which is provided in a projector housing, from being separated so that the excitation light sources may be used for other purposes, by a simple structure without troublesome processes at the time of manufacture. Further, if an adhesive having high flowability is used as a sealant 330, it is possible to seal a gap between the lens support 79 and the light source support 80 and to make the separation of the excitation light sources 71 not easy.

Figure 13:
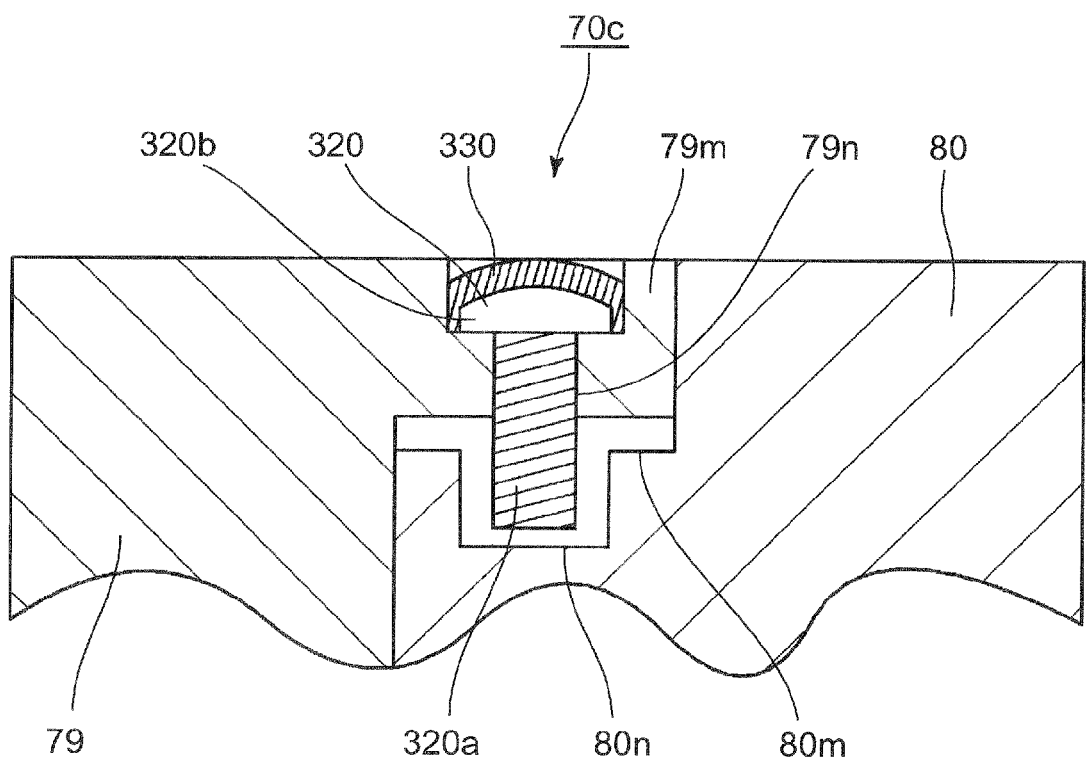
FIG. 13 is an enlarged cross-sectional view of the main parts of a light source device according to another modification of the embodiment of the invention.

Next, a light source device according to another modification of the embodiment of the invention will be described. FIG. 13 is an enlarged cross-sectional view of main parts of a light source device according to another modification of the embodiment of the invention. The description of the same structure and advantages as those of the modification shown in FIG. 12 will be omitted, and the differences between the modification and another modification will be described.

As shown in FIG. 13, in an excitation light irradiation device 70c, a lens support 79, which is a second support, includes a first protruding portion 79m. A light source support 80, which is a first support, includes a second protruding portion 80m. The first protruding portion 79m is adapted so as to form the side of an opening portion 16b of a housing with respect to the second protruding portion 80m. A screw 320 passes through and is fixed to a through hole 79n of the first protruding portion 79m and loosely fitted to a receiving hole 80n of the second protruding portion 80m. In detail, a threaded engagement portion, which is a female screw, is formed at the through hole 79n of the first protruding portion 79m, and a male screw of a main body portion 320a of the screw 320 is threadedly engaged with the threaded engagement portion.

Since the screw 320 passes through and is fixed to the through hole 79n of the first protruding portion 79m and loosely fitted to the receiving hole 80n of the second protruding portion 80m in a projector 10 employing the above-mentioned excitation light irradiation device 70c, it is possible to prevent excitation light sources 71 of the excitation light irradiation device 70c, which is provided in a projector housing, from being separated so that the excitation light sources may be used for other purposes, by a simple structure without troublesome processes at the time of manufacture.

Meanwhile, in the embodiment shown in FIG. 7, the first protruding portion 80a and the second protruding portion 79d fitted to the first protruding portion 80a have been circumferentially formed at the four sides of the light source support 80 and the lens support 79, respectively. However, the first protruding portion 80a and the second protruding portion 79d may form at least one surface of the lower portions of the light source support 80 and the lens support 79, or form two or three surfaces including the one surface of the lower portions and recessed hole portions 80c are formed on the surface of the lower portion of the first protruding portion 80a.

Further, the locking member is not limited to the screw 320. The locking member only has to include a head portion 320b to be received in the recessed hole portion 80c and a rod-like main body portion 320a having a diameter smaller than the diameter of the head portion 320b, the head portion 320b only has to be received in the recessed hole portions 80c, and an end of the main body portion 320a only has to be inserted into the receiving hole 79e of the second protruding portion 79d.

As described above, according to the invention, the excitation light irradiation device, which is a light source device, includes the light source support 80 that is a first support supporting the excitation light sources 71 as light sources, and a lens support 79 that is a second support supporting the collimator lenses 73 that condense the light emitted from the excitation light sources 71 supported by the light source support 80. The light source support 80 and the lens support 79 are integrated with each other by the screws 87 that are fixing members fixing the lens support 79 to the light source support 80. Further, the excitation light irradiation device includes the first protruding portion 80a that protrudes from the light source support 80 toward the lens support 79 or protrudes from the lens support 79 toward the light source support 80; includes the second protruding portion 79d that includes a notch receiving the first protruding portion 80a and is formed at the lens support 79 or the light source support 80. The first protruding portion 80a includes the through holes 80b into which the screws 320 as the locking members are inserted. Each of the screws 320 includes the rod-like main body portion 320a, the main body portion 320a of the screw passes through the through hole 80b formed at the first protruding portion 80a. The end of the main body portion 320a is inserted into the receiving hole 79e formed at the second protruding portion 79d, and the head portion 320b of the screw is embedded by the sealant 330. Therefore, it is possible to provide a light source device, a projector, and a method of assembling the light source device that can prevent light sources of a light source device, which is provided in a projector housing, from being separated so that the light sources may be used for other purposes, by a simple structure without troublesome processes at the time of manufacture.

Further, according to the invention, while the screws 320 as the locking members are loosely fitted to any one of the light source support 80 as the first support and the lens support 79 as the second support in the excitation light irradiation device, the head portions 320b of the screws 320 are embedded by the sealant 330. That is, it is possible to provide a light source device, a projector, a method of assembling the light source device of which the screws 320 are loosely fitted to any one of the first and second supports, that can prevent the deviation of the optical axes of the excitation light sources 71 and the collimator lenses 73, and that can prevent light sources of a light source device, which is provided in a projector housing, from being separated so that the light sources may be used for other purposes, by a simple structure.

Furthermore, according to the invention, the longitudinal directions of the through holes 80b into which the screws 320 are inserted are different from the directions where the screws 87 as the fixing members fixing the lens support 79 to the light source support 80 are inserted. Accordingly, it is possible to make the separation of the excitation light sources 71 of the excitation light irradiation device, which is performed after the separation of the light source support 80 from the lens support 79, not easy.

Moreover, according to the invention, the surface of the first protruding portion 80a further includes the recessed hole portions 80c that receive the head portions 320b of the screws 320 as the locking members, and the head portions 320b of the screws 320 are embedded by the sealant 330 while being received in the recessed hole portions 80c. Therefore, it is possible to provide a light source device, a projector, and a method of assembling the light source device so that the screws 320 are not easily separated and can prevent light sources of a light source device, which is provided in a projector housing, from being separated so that the light sources may be used for other purposes.

Further, according to the invention, in the excitation light irradiation device, male screws are formed at the main body portions 320a of the screws 320 that are the locking members, the through holes 80b are formed so as to have a diameter larger than the diameter of each of the main body portions 320a of the screws 320, and female screws with which the male screws formed on the main body portions 320a of the screws 320 are threadedly engaged are formed at the receiving holes 79e. That is, since the screws 320, which are the locking members, are reliably fixed to the receiving holes 79e and are sealed by the sealant 330, the separation of the screws 320 may not be easy and the separation of the excitation light sources 71 of the excitation light irradiation device may not be easy.

Furthermore, according to the invention, the first protruding portion 80a is formed at the circumference of the light source support 80 or the lens support 79 and the recessed hole portions 80c formed on the surface of the first protruding portion 80a are formed on only one side surface of the light source support 80 or the lens support 79 where the first protruding portion 80a is formed. Accordingly, as compared to a case where the recessed hole portions 80c are formed on a plurality of side surfaces, it is possible to easily manufacture an excitation light irradiation device by disposing screws 320 in the recessed hole portions 80c that are formed on the one surface without troublesome processes at the time of manufacture.

Moreover, according to the invention, for example, at least three recessed hole portions 80c are formed at the first protruding portion 80a, and a distance between at least one of the recessed hole portions 80c and the end portion of the first protruding portion 80a is different from a distance between the other recessed hole portion 80c and the end portion of the first protruding portion 80a. Accordingly, the separation of the excitation light sources 71 of the excitation light irradiation device may not be easy. In detail, for example, a recessed hole portion 80c, which has a distance between itself and the end portion of the first protruding portion 80a different from a distance between the other recessed hole portions 80c and the end portion of the first protruding portion 80a, may be formed at a portion, which is close to the end portion of the first protruding portion, of the middle portion between two first protruding portions 80a shown in FIGS. 5 and 6. Further, a plurality of receiving holes 79e are formed at the second protruding portion 79d so as to correspond to a plurality of recessed hole portions 80c, respectively, and a plurality of screws 320 corresponding to the receiving holes 79e are provided. According to this, it is possible to make the separation of the excitation light sources 71 of the excitation light irradiation device not easy.

Furthermore, according to the invention, the projector includes: excitation light irradiation devices that are a plurality of light source devices; a light guide optical system 140 that changes the optical axes of light emitted from the plurality of excitation light irradiation devices into the same optical axis; a display element 51; a light source-side optical system 170 that guides the light, of which the optical axes are changed into the same optical axis by the light guide optical system 140, to the display element 51; a projection-side optical system 220 that projects an optical image, which is formed by the display element 51, on a screen; a cooling fan 261 that is a cooling device; and a controller 38 that is projector controller for controlling the excitation light irradiation devices or the display element 51 and the cooling fan 261. At least one of the plurality of excitation light irradiation devices is the above-mentioned excitation light irradiation device. Therefore, it is possible to provide a light source device assembled in a projector, the projector, and a method of assembling the light source device that can prevent light sources of the light source devices, which are provided in a projector housing and pass comprehensive inspection, from being separated so that the light sources may be used for other purposes, by a simple structure.

Moreover, according to the invention, the recessed hole portions 80c formed at the first protruding portion 80a of the excitation light irradiation device correspond to the lower surface of the excitation light irradiation device, and the excitation light irradiation device is disposed within an opening portion 16b formed at the bottom of the projector. Accordingly, it is possible to easily manufacture an excitation light irradiation device and a projector including the excitation light irradiation device without troublesome processes at the time of manufacture.

In addition, according to the invention, a method of assembling an excitation light irradiation device of a projector 10, which includes the excitation light irradiation device having the above-mentioned structure, includes: fixing a lens support 79 to a light source support 80 by screws 87, which are fixing screws, after performing adjustment so as to align optical axes of collimator lenses 73 with optical axes of the excitation light sources 71; inserting screws 320, which are locking members, into recessed hole portions 80c after adjusting an optical property of the projector by assembling an excitation light irradiation device, of which the lens support 79 and the light source support 80 are fixed to each other, in a housing of the projector 10; and filling the recessed hole portions 80c with a sealant 330 after performing comprehensive inspection of the projector 10. Accordingly, it is possible to provide a light source device assembled in a projector 10, the projector 10, and a method of assembling the light source device that can prevent excitation light sources 71 of the excitation light irradiation devices, which are provided in a projector housing and pass comprehensive inspection, from being separated so that the excitation light sources may be used for other purposes, by a simple structure without troublesome processes at the time of manufacture.

Further, in a projector according to a modification where a lens support 79 and a light source support 80 are fixed to each other without using the above-mentioned screws 320 by the application of an anaerobic adhesive in a gap between the lens support 79 and the light source support 80 so that the separation of the excitation light sources 71 is prevented, it is necessary to perform troublesome manufacturing processes, for example, a process for preparing spacers having various thicknesses in advance, a process for fixing the lens support 79 to the light source support 80 by the application of an anaerobic adhesive after disposing a corresponding spacer in the gap between the lens support 79 and the light source support 80. Meanwhile, in a method of assembling the light source device according to the invention, it is possible to produce a light source device having the above-mentioned advantages and a projector 10, in which the light source device is assembled, by simple manufacturing processes without the above-mentioned troublesome processes.

The invention is not limited to the embodiment and the modifications, and may be freely changed and modified without departing from the scope of the invention. In the projector according to the embodiment of the invention, the sealant 330 has been applied to the screws 320 so that the screws 320 are not easily separated. However, the invention is not limited to this embodiment. For example, the screws 320 may not be easily separated by changing the shape of the groove of the head portion 320b of the screws 320. Further, rivets, which have a shape so as not to be easily separated, may be used instead of the screws 320.

Furthermore, when a predetermined gap is formed between the first protruding portion 80a of the light source support 80 and the second protruding portion 79d of the lens support 79 for the adjustment of the optical axes of, for example, the excitation light sources 71 and the collimator lenses 73, it is preferable that the mounting positions of the screws 87 can be appropriately adjusted.

Moreover, each embodiment has been described with reference to drawings where side surfaces of the lens support 79 and the light source support 80 perpendicular to the directions P1 and P2 come into contact with each other. However, a gap may be formed in a certain mechanism that adjusts an optical axis.

Each embodiment has been described with reference to an example where the recessed hole portions, which receive the head portions of the locking members, are formed on the surface of the first protruding portion. However, the recessed hole portions are not necessarily needed and may not be formed. If the recessed hole portions are formed, there is an advantage of performing easy filling of a sealant and easy sealing.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A light source device comprising:
   a first support that supports one of: (i) a light source and (ii) a collimator lens which condenses light emitted from the light source;
   a second support that supports the other of the light source and the collimator lens;
   a fixing member that fixes the first support to the second support; and
   a locking member comprising a head portion and a rod portion connected to the head,
   wherein the first support comprises a first protruding portion that protrudes from the first support toward the second support, the first protruding portion having a through hole therethrough,
   wherein the second support comprises a second protruding portion that protrudes from the second support toward the first support, the second protruding portion having: (i) a receiving portion that receives the first protruding portion, and (ii) a receiving hole, and
   wherein the rod portion of the locking member is inserted into the through hole of the first protruding portion of the first support and the receiving hole of the second protruding portion of the second support, and the head portion of the locking member is sealed with a sealant.

2. The device of claim 1, wherein the first support supports the light source, and the second support supports the collimator lens.

3. The device of claim 1, wherein the first support supports the collimator lens, and the second support supports the light source.

4. The device according to claim 1, wherein the head portion of the locking member is sealed with the sealant while the locking member is loosely fitted to the first support.

5. The device according to claim 1, wherein the locking member is inserted into the through hole of the first protruding portion of the first support in a direction different from a direction in which the fixing member fixes the first support to the second support.

6. The device according to claim 1, wherein:
   the first protruding portion includes a recessed hole portion that receives the head portion of the locking member, and
   the head portion of the locking member is sealed with the sealant while the head portion of the locking member is housed in the recessed hole portion.

7. The device according to claim 1, wherein:
a male screw is formed at the rod portion of the locking member,
a diameter of the through hole of the first protruding portion of the first support is larger than a diameter of the rod portion of the locking member, and
a female screw engaged with the male screw is formed at the receiving hole of the second protruding portion of the second support.

8. The device according to claim 1, wherein the first protruding portion is formed at a circumference of the first support, and the through hole of the first protruding portion of the first support is formed through one side surface of the first support.

9. The device according to claim 1, wherein:
the first protruding portion has at least three through holes, and
a distance between one of the through holes and an end portion of the first protruding portion is different from a distance between the remaining through holes and the end portion of the first protruding portion.

10. A projector comprising:
the light source device of claim 1;
a light guide optical system that adjusts an optical axis of light emitted from the light source device;
a display element;
a light source-side optical system that guides the adjusted light to the display element;
a projection-side optical system that projects an optical image, which is formed by the display element, on a screen; and
a projector controller that controls the light source device and the display element.

11. The projector of claim 10, wherein a penetration direction of the through hole of the first protruding portion of the first support is substantially perpendicular to a lower surface of the light source device, and the light source device is disposed within an opening portion formed at a bottom portion of the projector.

12. A method of installing the light source of claim 1 in a projector, the method comprising:
(a) aligning an optical axis of the collimator lens with an optical axis of the light source;
(b) fixing the second support to the first support by the fixing member;
(c) installing the light source into a housing of the projector after step (b);
(d) adjusting an optical property of the projector;
(e) inserting the locking member into the through hole of the first protruding portion of the first support after step (d);
(f) testing the projector; and
(g) sealing the head portion of the locking member with the sealant after step (f).

* * * * *